US008219515B2

(12) United States Patent
Jordan et al.

(10) Patent No.: US 8,219,515 B2
(45) Date of Patent: *Jul. 10, 2012

(54) VISUALIZATION OF DATA RECORD PHYSICALITY

(75) Inventors: Neil A Jordan, Seattle, WA (US); Chris B Karkanias, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,792

(22) Filed: Jul. 29, 2011

(65) Prior Publication Data

US 2011/0289038 A1    Nov. 24, 2011

Related U.S. Application Data

(63) Continuation of application No. 12/133,213, filed on Jun. 4, 2008, now Pat. No. 8,001,071.

(51) Int. Cl.
*G06F 17/00* (2006.01)
*G06N 5/02* (2006.01)
(52) U.S. Cl. ........................................... 706/47
(58) Field of Classification Search ............... 706/47
See application file for complete search history.

(56) References Cited

U.S. PATENT DOCUMENTS

| | | | |
|---|---|---|---|
| 5,836,872 A | 11/1998 | Kenet et al. | |
| 6,347,329 B1 | 2/2002 | Evans | |
| 6,523,009 B1 | 2/2003 | Wilkins | |
| 6,684,276 B2 | 1/2004 | Walker et al. | |
| 6,857,317 B2 | 2/2005 | Sakurai | |
| 6,959,427 B2 | 10/2005 | Kimura | |
| 7,399,080 B2 | 7/2008 | Kitani et al. | |
| 7,458,894 B2 | 12/2008 | Danieli et al. | |
| 7,488,075 B2 | 2/2009 | Yamakaji | |
| 7,566,133 B2 | 7/2009 | Yamakaji | |
| 8,001,071 B2 * | 8/2011 | Jordan et al. ................ 706/47 |
| 2002/0065854 A1 | 5/2002 | Pressly | |
| 2005/0038678 A1 | 2/2005 | Qian et al. | |
| 2005/0043970 A1 | 2/2005 | Hsieh | |
| 2005/0102315 A1 | 5/2005 | Krishnan | |
| 2006/0064396 A1 | 3/2006 | Wei et al. | |
| 2008/0095418 A1 | 4/2008 | Moriya | |
| 2009/0307170 A1 | 12/2009 | Jordan et al. | |

OTHER PUBLICATIONS

Balahur, et al., "A Feature Dependent Method for Opinion Mining and Classification" In the Proceedings of the International Conference on Natural Language Processing and Knowledge Engineering, Oct. 2008, pp. 1-7.

Chittaro, "Information Visualization and its Application to Medicine", Artificial Intelligence in Medicine, May 2001, vol. 22, Issue 2, pp. 81-88.

(Continued)

*Primary Examiner* — Michael B Holmes
(74) *Attorney, Agent, or Firm* — Lee & Hayes, PLLC; Shirley Anderson

(57) ABSTRACT

Systems (and corresponding methodologies) that enable inferences to be drawn from the physicality of electronic information much like that of a visual inspection of physical records are provided. In other words, a user is able to draw inferences from parameters of electronic data such as quantity, regularity, age, condition, type, keywords, title, author, origination date, storage location, etc. The innovation provides a data observation system having a summarization generator component and a rendering component that conveys attributes of electronic data such that inferences and conclusions based upon the physicality of the data.

20 Claims, 10 Drawing Sheets

OTHER PUBLICATIONS

Gresh, et al., "PRIMA: A Case Study of Using Informaiton Visualization Techniques for Patient Record Analysis", Proceedings of the Conference on Visualization, Session: C2, 2002, pp. 509-512.

Plaisant, et al., "LifeLines: Using Visualization to Enhance Navigation and Analysis of Patient Records", Proceedings of the American Medical Informatics Association Annual Fall Symposium, 1998, pp. 76-80.

Tschirley, et al., "Patient-Oriented Segmentation and Visualization of Medical Data", In Proceedings of CGIM 2002 Computer Graphics and Imaging, 2002, pp. 214-219.

Wong, et al., "Improving Text Classification Performance by Heuristics-Guided Exploration of Derived Features", In the Proceedings of the International Conference on Machine learning and Cybernetics, Aug. 2006, pp. 3323-3328.

Wu, et al., "News Filtering and Summarization on the Web", IEEE Intelligent Systems, vol. 25, Issue 5, Sep. 2010, pp. 68-76.

Xu, "A Pr/T-Net Formalism for HPSG Parsing", In the Proceedings of the International Conference on Machine Learning and Cybernetics, vol. 4, Aug. 2004, pp. 2563-2568.

* cited by examiner

VISUALIZATION OF DATA RECORD PHYSICALITY

CROSS-REFERENCE TO RELATED APPLICATION

This application is a continuation of, and claims priority to, commonly assigned co-pending U.S. patent application Ser. No. 12/133,213, U.S. Pat. No. 8,001,071, entitled "Visualization of Data Record Physicality," filed on Jun. 4, 2008, the entire disclosure of which is incorporated by reference herein in its entirety.

BACKGROUND

Technological advances in computer hardware, software and networking have lead to increased demand for electronic information storage and exchange rather than through conventional techniques such as paper and magnetic media, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes increasingly important to store and/or utilize such data in a manageable manner that facilitates user-friendly and quick data searches and retrieval. Generally, various companies, enterprises, businesses, and the like store electronic data that includes a tremendous amount of files, records, image files, sound files, etc. For example, office productivity tools (e.g., word processing, spread sheets, presentation software, mail applications, contact applications, networks, instant messaging applications, etc.) can include a wealth of information about the user as well as a user's contact lists and/or interaction with contacts.

There are numerous advantages to electronic storage of data. For example, electronic data ensures backup, enhances search-ability and reduces the amount of space necessary for storage as compared to hardcopy or physical storage. Unfortunately, many of the advantages of physical record observations are lost when the information is converted to electronic format. In other words, one can infer information from the visual size, condition, markings, etc. of a hardcopy file—which is essentially lost when converted to electronic format.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems (and corresponding methodologies) that enable inferences to be drawn from electronic information much like that of a visual inspection of physical records. In other words, a user is able to draw inferences from the plurality of electronic data as a factor of quantity, regularity, age, condition, type, keywords, title, author, origination date, storage location, etc.

In an aspect of the subject innovation, a system is provided that includes a data observation system having a summarization generator component and a rendering component. In operation, the summarization generator component inspects, evaluates and analyzes electronic data (and metadata associated therewith) to establish a summary or observation of the data. In other words, the summarization generator component can establish observations, perceptions, estimations, patterns, etc. by way of virtually visualizing the physicality of documents and drawing conclusions based upon descriptive factors and attributes.

The rendering component is capable of conveying the summary or observation by way of a dashboard or other suitable presentation. In one example, a dashboard can be employed to visually render a graphical rendition of the electronic data as it would appear if it were in physical form. The summarization component is employed to automatically establish observations and analyses based upon physical characteristics of the data.

In aspects thereof, an artificial intelligence component and/or machine learning & reasoning mechanism is provided that employs a probabilistic and/or statistical-based analysis to prognose or infer an action that a user desires to be automatically performed. The logic can be explicitly or implicitly trained based upon pre-programmed rules, feedback, or the like.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
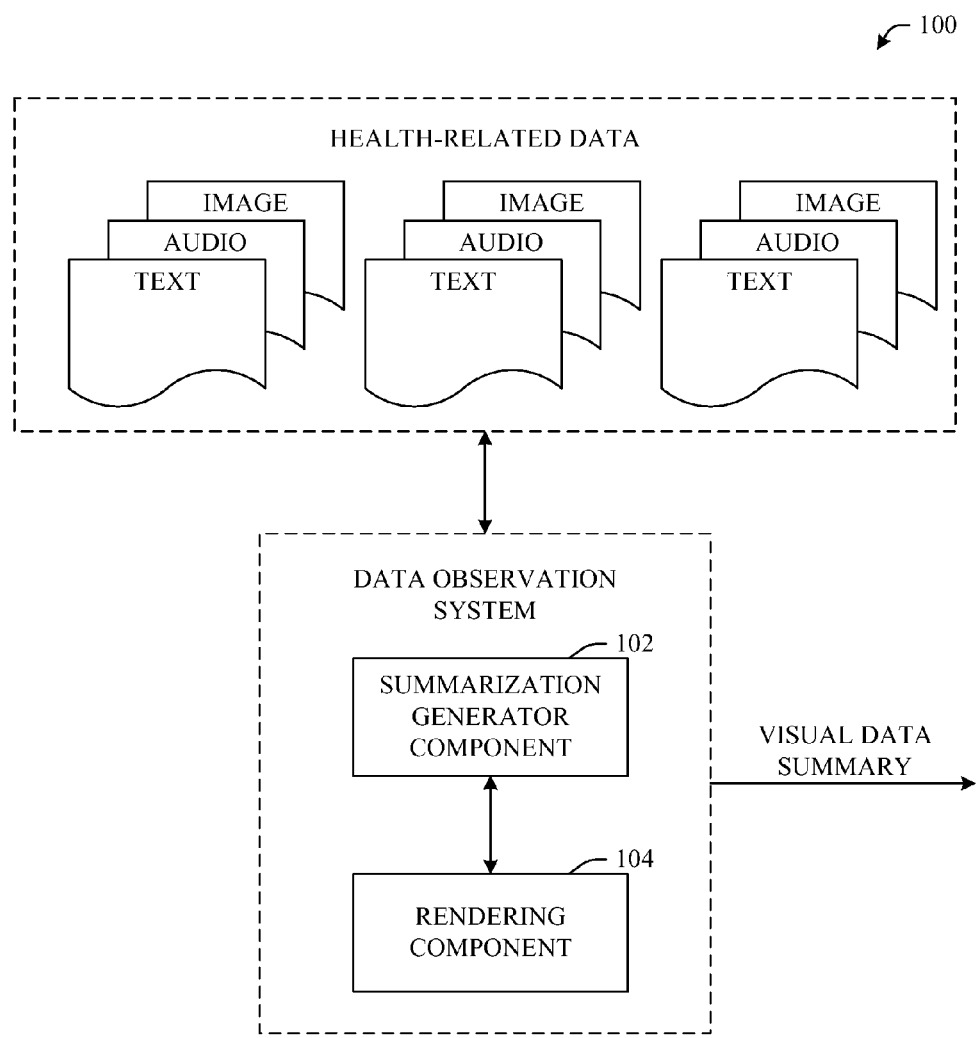
FIG. 1 illustrates an example block diagram of a system that facilitates establishment of a summary of electronic data based upon the physicality of the data.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a block diagram of a system 100 that facilitates generation of a visual observation of electronic data. In examples, the system 100 can make inferences based upon the amount of electronic data, for instance, a large amount of data can indicate that a patient is diligent in visiting healthcare professionals and/or attending to medical issues. Similarly, regularity of data can further support a patient's diligence in addressing medical issues or being proactive in preventing issues. While many of the examples described herein are related to healthcare (e.g., health and human services/social services) and data associated therewith, it is to be understood that the features, functions and benefits of the innovation can be applied to most any industry, including, but not limited to, legal, accounting (e.g., taxes), or the like. These and other case record examples are to be included within the scope of this disclosure and claims appended hereto.

Generally, system 100 includes a summarization generator component 102 and a rendering component 104 that together establish observations of electronic data similar to those observations that can be gleaned from physical data. For instance, the quantity, age, condition, type, etc. of physical data conveys information and enables an observer to infer characteristics and descriptions from the physical attributes (or physicality) of the physical documents. Unfortunately, once physical data is converted to electronic data, many of the descriptive features are conventionally lost in the translation.

For example, the physicality of documents (e.g., health records) can prompt inferences about the content of the data, characteristics of the subject (e.g., patient), regularity of the data, condition of the data, etc. In other words, in a healthcare scenario, a doctor can make inferences based upon amount, condition, etc. of the physical records. Here, in accordance with the innovation, the summarization generator component 102 can analyze the electronic data (e.g., descriptive metadata, content) and thereafter instruct the rendering component 104 how best to render a visual depiction of the compilation of data.

In one aspect, a computer-generated image of the data can be established which incorporates or depicts descriptive characteristics. For instance, older documents can be shown on yellowed or tattered paper/files, important points in the documents can be highlighted or page corners turned down to mark interesting documents or sections of documents. Narrative documents can appear differently from image documents, sound files, etc. As will be understood, the examples are too numerous to list. Essentially, in aspects, the innovation enables or facilitates a visual rendering of electronic data such that a viewer can establish interpretations or reach conclusions based upon the visual appearance of the documents. Similarly, in other aspects, the system 100 (e.g., via inferences or rules) can propose conclusions based upon interpretations and analyses of the visual aspects of the electronic data.

Figure 2:
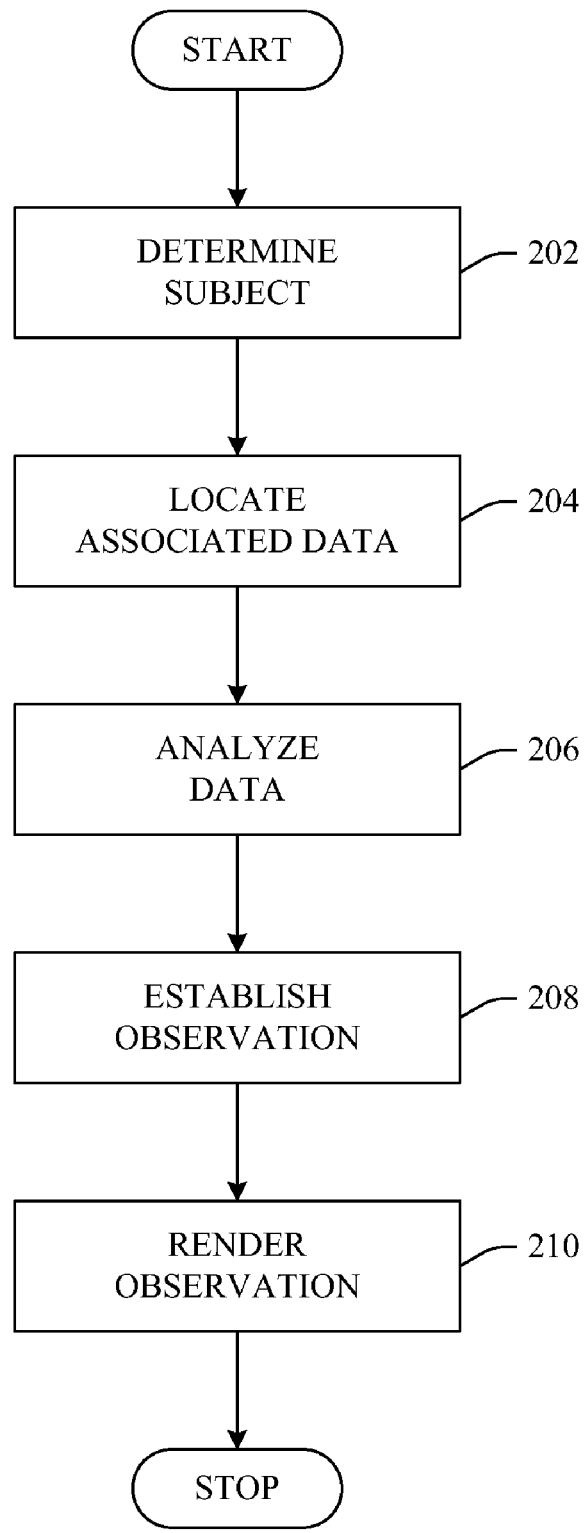
FIG. 2 illustrates an example flow chart of procedures that facilitate establishing an observation based upon physicality of data in accordance with an aspect of the innovation.

FIG. 2 illustrates a methodology of interpreting visual cues associated to electronic data in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a subject is determined. Here, a user (e.g., doctor) can specify a subject (e.g., patient) to whom data is associated. Data associated to the subject can be located at 204. In this act, data can be associated from most any location including but not limited to, local stores, remote stores, distributed sources, or the like. For example, in the healthcare scenario, information can be gathered from various sources (e.g., heath-care entities/professionals) and thereafter consolidated or aggregated at 204.

At 206, the gathered data is analyzed, for example, metadata associated with the data is analyzed. Similarly, data type, origination location, origination date, etc. can be analyzed. Still further, relationships between the data elements/records, can be analyzed to determine a timeline or other relevant relationship(s). Additionally, the data can be compared to other data, such as other patients of similar demographics, characteristics, etc. Thus, inferences can be drawn based upon the comparisons. By way of example, an inference can be drawn based upon the amount of data of one patient to another from a similar demographic. In other words, inferences and conclusions regarding healthcare state, condition, diligence, etc. can be drawn from the amount of data associated to one patient versus another. As will be understood, many other inferences and/or conclusions can be drawn by comparing data between subjects from similar demographics.

Figure 3:
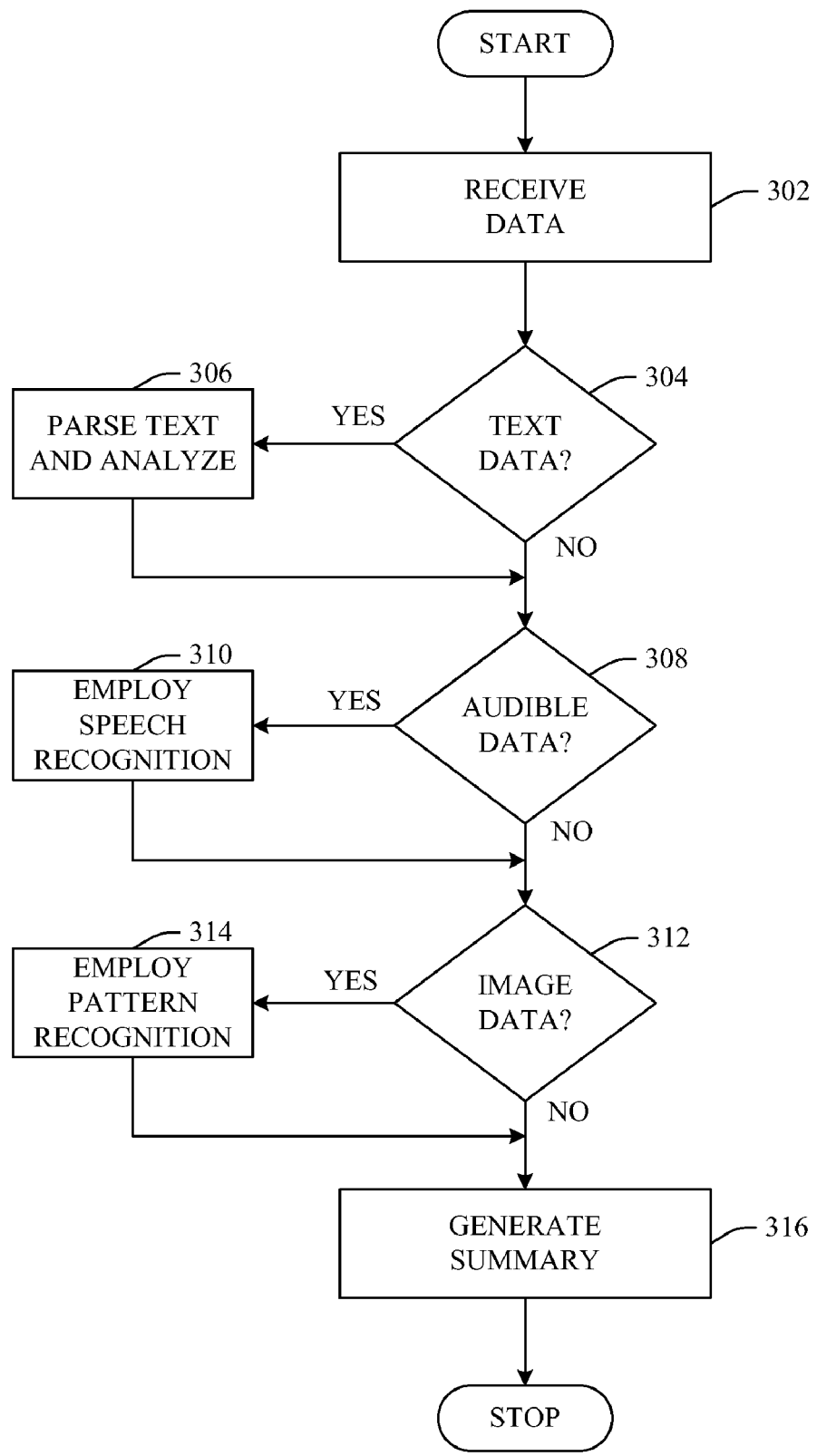
FIG. 3 illustrates an example flow chart of procedures that facilitate generating a summary of electronic data in accordance with an aspect of the innovation.

Referring now to FIG. 3, there is illustrated a methodology of establishing summary of documents (e.g., healthcare record) in accordance with the innovation. At 302, data is received, for example, healthcare records, tax records, legal records, automobile service record, etc. Additionally, the data can be received (or accessed) by way of a crawler or other tool designed to automatically retrieve data associated to a subject from multiple sources, for instance, Internet- or network-based sources.

At 304, a determination is made to conclude if the document includes text data. If so, at 306, the data can be parsed and analyzed to determine keywords and/or context of the content. Similarly, at 308, a determination can be made to conclude if the document includes audible data. If the document includes audible data, at 310, speech recognition (or other suitable sound analysis) mechanisms can be used to establish keywords associated with the audible data and subsequently the context of the keywords in view of the translated document. By way of example, if the audible data is a medical dictation, the speech recognition can be used to translate audible speech into text, whereby, further analysis can be performed to establish the context of the data.

Still further, at 312, a determination is made if the document contains visible data (e.g., image data, x-rays, MRIs (magnetic resonance imaging data)). As with text and sound described above, if visible data is present, key features (e.g., attributes and/or characteristics) can be established via pattern recognition mechanisms at 314. Pattern recognition can be employed to determine characteristics or conditions included within the image such as, for example, bones, organs, etc. Thus, context of the data can be established.

Once the data is analyzed (e.g., 304-314), at 316, a summary of the data can be generated. In other words, based upon the physicality, an observation or summary of the data can be established at 316. Effectively, the summary enables the innovation to virtually recreate the physical attributes of the data. Thus, inferences and conclusions can be drawn as if the data was in its physical form rather than converted to electronic format.

Figure 4:
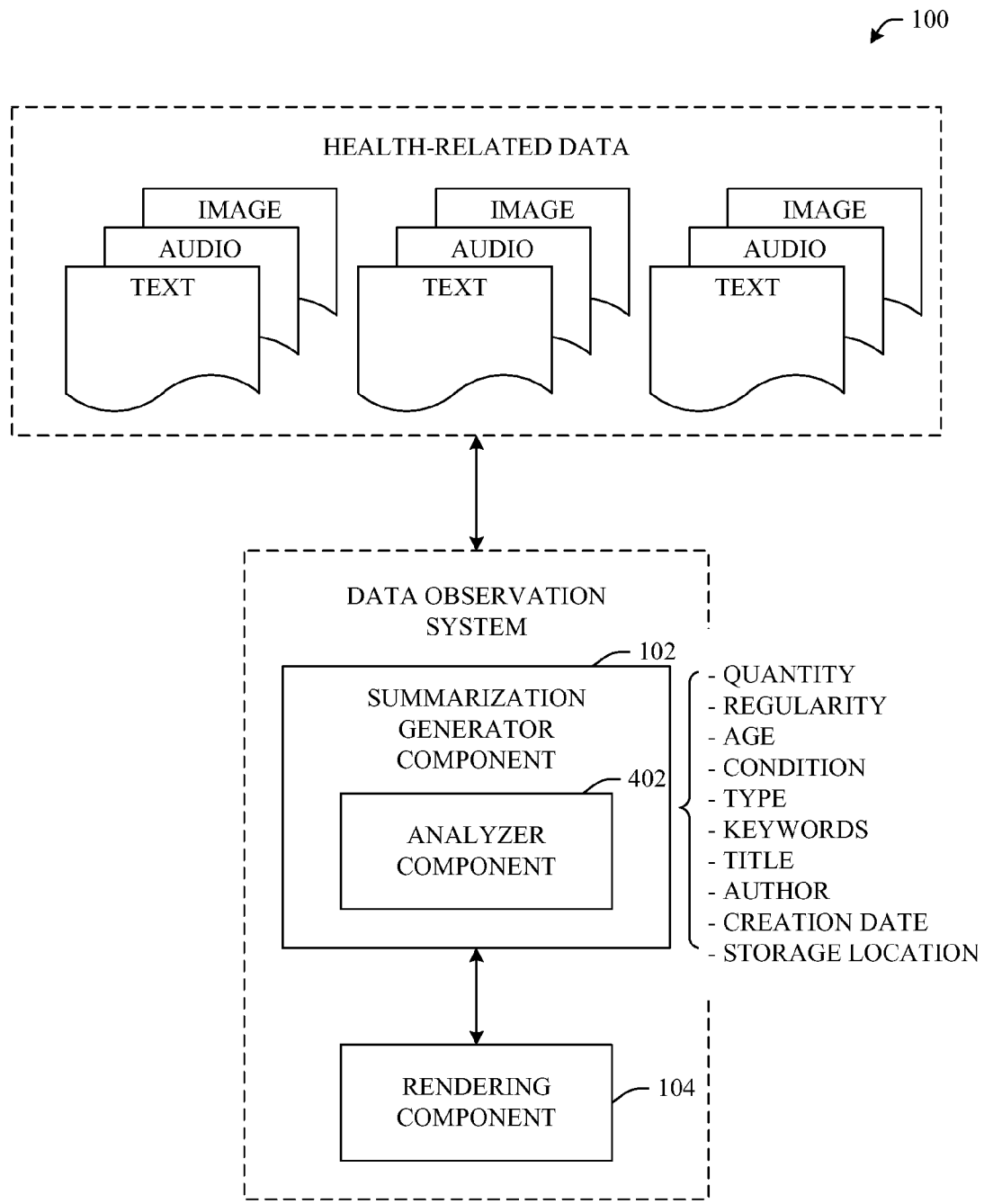
FIG. 4 illustrates an alternative block diagram of a system that employs an analyzer component to establish the observation of the electronic data.

Turning now to FIG. 4, an alternative example block diagram of system 100 is shown. Generally, FIG. 4 illustrates that the summarization generation component 102 can include an analyzer component 402. The analyzer component 402 can evaluate criteria and parameters associated with the data (e.g., health-related data). As described above, this analysis can be used to generate a visual rendering of the electronic data and/or to draw inferences and/or conclusions based upon the result(s) of the analysis.

As shown in FIG. 4, the analyzer component 402 can consider factors, such as, but not limited to, quantity, regularity, age, condition, type, keywords, title, author, creation date, storage location, etc. Additionally, as discussed supra, the analyzer component 402 can also compare the data to other data to facilitate establishment of conclusions and inferences. These and other examples will be better understood upon a review of the figures that follow infra.

Figure 5:
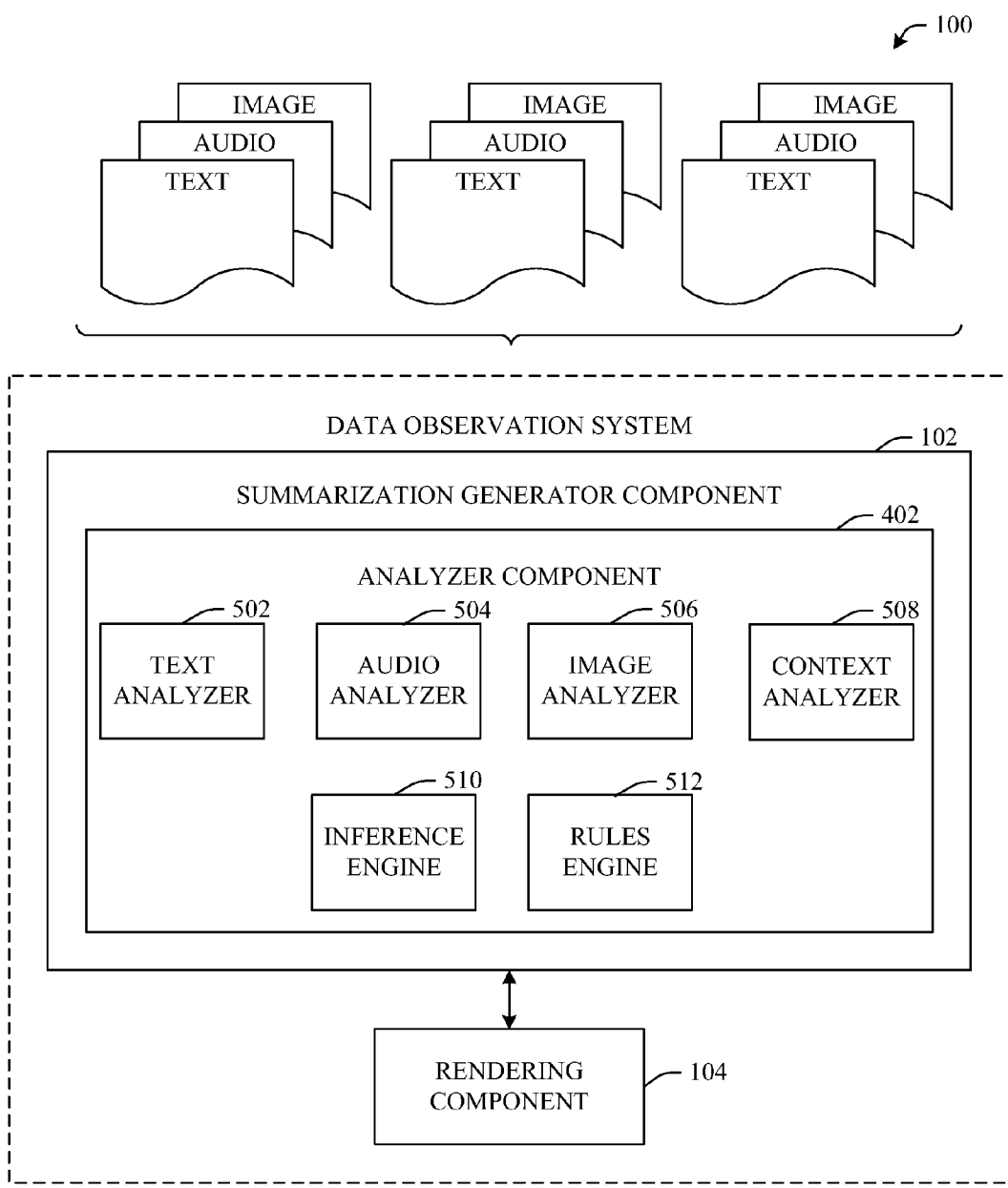
FIG. 5 illustrates an alternative block diagram of a system that employs specialized analyzer components, an inference engine and a rules engine in accordance with aspects of the innovation.

FIG. 5 illustrates yet another alternative example of system 100 in accordance with an aspect of the innovation. As depicted, the analyzer component 402 can include a text analyzer 502, an audio analyzer 504, an image analyzer 506, a context analyzer 508, an inference engine 510 and a rules engine 512, or combination thereof. Together, these sub-components facilitate the 'visual-itics' of the innovation. The term 'visual-itics' is intended to refer to a combination of 'visualization' and 'analytics.' As described above, the innovation provides mechanisms by which inferences and conclusions can be drawn from the visual representation of electronic data. In other words, much like inferences and conclusions can be drawn from physical records (e.g., amount, condition, type . . . ), the innovation enables the same or similar inferences and conclusion to be drawn from electronic data. These inferences and conclusions can be drawn, whether or not the data was originally captured in physical form or directly into electronic format.

The text analyzer 502, audio analyzer 504, image analyzer 506 and context analyzer 508 illustrated in FIG. 5 can be employed establish and evaluate the data based upon type, content, as well as other descriptive characteristics, attributes and/or parameters. Once these sub-components (502-508) are employed to capture information about the data, an inference engine 510 and/or a rules engine 512 can be employed to draw inferences or conclusions related to the data.

The inference engine 510 can employ artificial intelligence (AI) or other suitable machine learning & reasoning (MLR) logic which facilitates automating one or more features in accordance with the subject innovation. The subject innovation (e.g., in connection with drawing inferences from visual representations and attributes) can employ various AI- or MLR-based schemes for carrying out various aspects thereof. For example, a process for determining an appropriate or suitable conclusion to be drawn from a visual representation can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of medical records, for example, attributes can be words or phrases or other data-specific attributes derived from the words or phrases and the classes can be categories or data type.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria what conclusion(s) (or inferences) to draw based upon a combination of data parameters and/or characteristics.

Similar to the inference engine 510, a rules engine 512 can be employed to provide the decision logic in place of, or in addition to the inference engine 510. In accordance with this alternate aspect, an implementation scheme (e.g., rule) can be applied to define and/or implement a set of criteria by which conclusions are drawn. It will be appreciated that the rule-based implementation can automatically and/or dynamically define conclusions to be drawn from a specific set of information or attributes. In response thereto, the rule-based implementation can make determinations by employing a predefined and/or programmed rule(s) based upon most any desired criteria (e.g., quantity, age, condition, type, author, storage location . . . ).

It is to be understood that rules can be preprogrammed by a user or alternatively, can be built by the system on behalf of the user. Additionally, the system (e.g., analyzer component 402) can 'learn' or 'be trained' by actions of a user or group of users. In one example, once a user is provided with a visual representation of electronic data, the user can convey their interpretation of the representation to the system. Thus, upon subsequent renderings of the same or similar visual data sets, the system 100 can provide an inference(s) based upon learning from a user's past actions.

Figure 6:
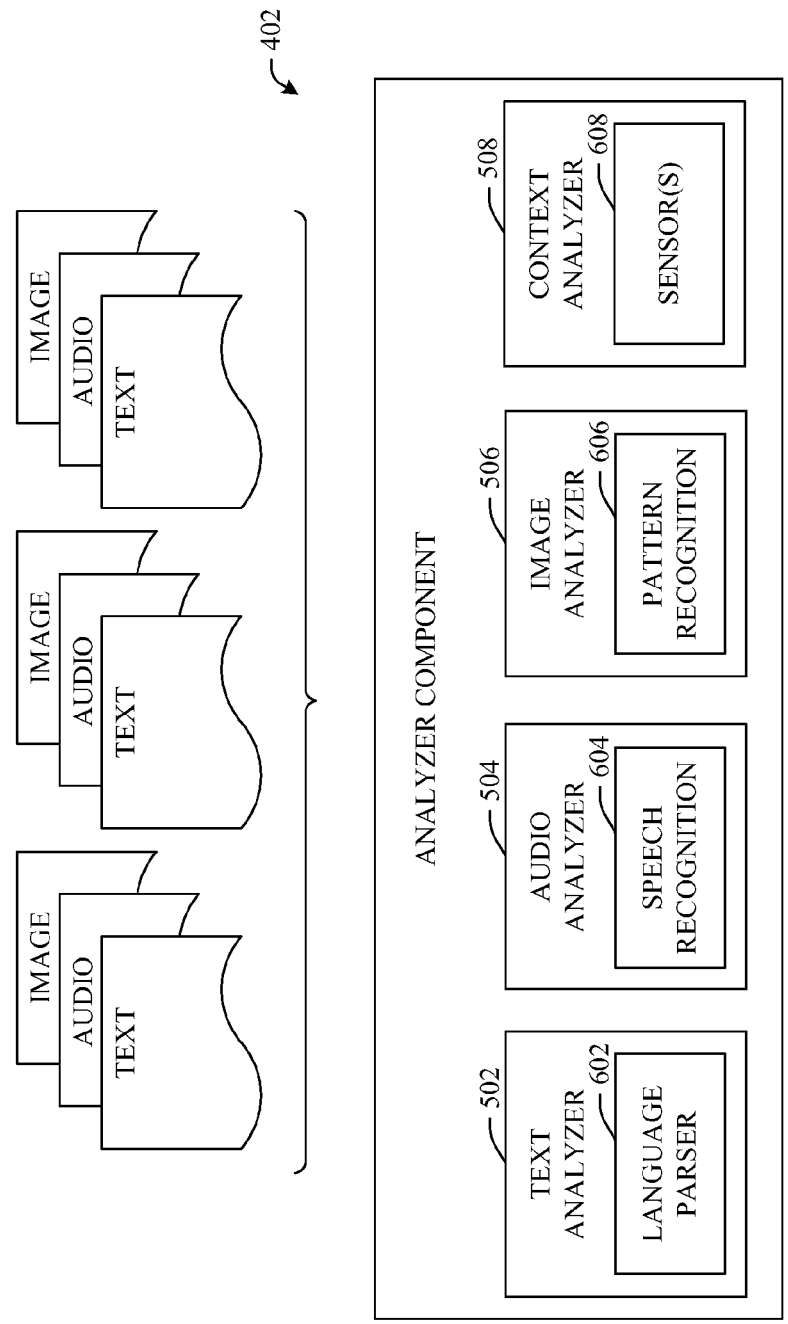
FIG. 6 illustrates an alternative block diagram of a system that employs specialized analyzer sub-components in accordance with an aspect of the innovation.

FIG. 6 illustrates an example block diagram of an analyzer component 402. Specifically, FIG. 6 illustrates that the text analyzer component 502 can include a language parser component 602, the audio analyzer component 504 can include a speech recognition (or speech to text converter) component 604, the image analyzer component 506 can include a pattern recognition component 606, and the context analyzer component 508 can include 1 to N sensors 608, where N is an integer. As described above, each of these sub-components (602, 604, 606, 608) can be employed to establish attributes as well as a visual representation of an electronic document or group of records. This representation need not be based upon the content per se of the data. Rather, the representation can be illustrative of what the documents would look like, for example, upon a desk/table, in a room, in a file cabinet, etc. As described in detail above, inferences and conclusions can be drawn from this visual depiction of the data.

By way of example, the image analyzer component 506, together with the pattern recognition component 606 can be employed to interpret images included within a document. For example, x-rays and MRI image data can be examined to determine scope and/or purpose of the x-ray or scan. Similarly, pattern recognition can be used to identify bones, organs, etc. within an image. These interpretations can be used by the analyzer component 402 to facilitate establishment of a visual rendition of the data as well as conclusions of a patient's health, medical history, etc.

In another example, the context analyzer 508 together with the sensor(s) 608 can be employed to establish contextual awareness regarding the perceived physicality of the data. For instance, if viewer is a specialist in one field of medicine, the context analyzer 508, together with the sensor(s) 608 can recognize this fact, and, accordingly, the rendering of the documents and/or inferences drawn from the visual rendering can be based upon the perceived audience or specialist.

Figure 7:
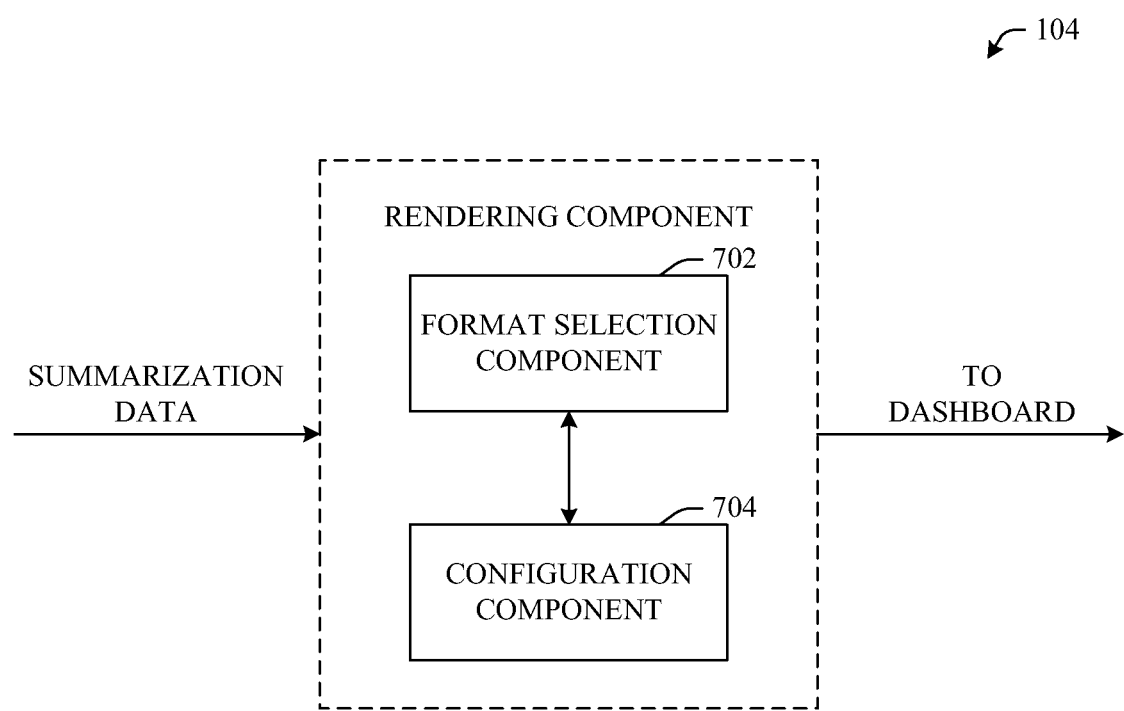
FIG. 7 illustrates an example block diagram of a rendering component in accordance with an aspect of the innovation.

FIG. 7 illustrates an example rendering component 104 having a format selection component 702 and a configuration component 704 included therein. In operation, the format selection component 702 is capable of establishing an appropriate format for the data. For instance, this format can be based upon an inference, preference, policy or the like.

In one example, the format can be an actual visual representation of the data upon a screen or display. In this example, a virtual photograph or image can be established that virtually places the data upon a desk or table thereby showing the physical attributes of the electronic data. In another example, the physical attributes of the data can be presented in a graphical form, e.g., bar chart, pie chart or the like. In either of these examples, the physicality of electronic data can be formatted for rendering upon a dashboard (or other display).

The configuration component 704 can be employed to manage the layout and/or organization of the day upon a display. In other words, the configuration component 704 can be employed to comprehensively arrange or otherwise organize the data for presentation to a user. In examples, the configuration component 704 can be employed to establish the rendering of the electronic data in accordance with the format selected or otherwise in accordance with the display apparatus or device.

Figure 8:
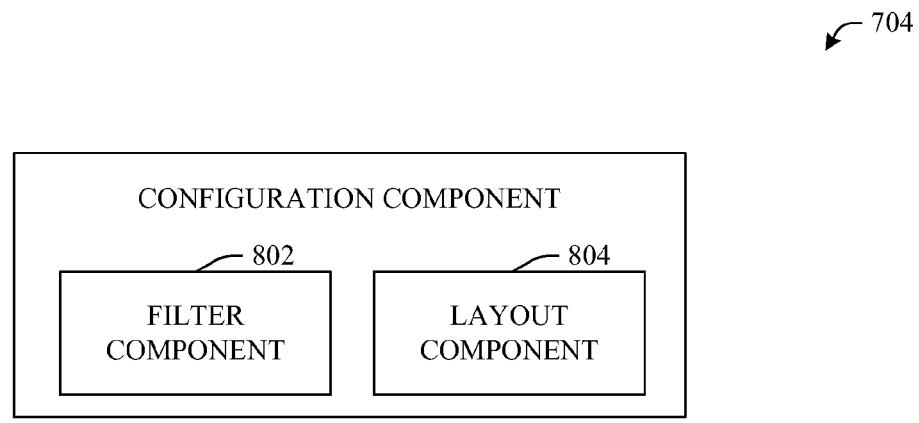
FIG. 8 illustrates an example block diagram of a configuration component in accordance with an aspect of the innovation.

FIG. 8 illustrates an example configuration component 704 that includes a filter component 802 and a layout component 804. Each of these sub-components (802, 804) is employed to render a comprehensive presentation of the physicality of electronic documents. Each of these components can be employed to affect the rendering of the physicality of electronic documents in accordance with the innovation. For instance, in aspects, the sub-components (802, 804) can be employed to establish a personalized observation of the physicality of electronic documents. As described above, the innovation can learn from a viewer's behavior or otherwise render in accordance with preprogrammed logic or rules.

The filter component 802 can be employed to filter information as desired or appropriate. For example, if a specialist if interesting in making interpretations from the physicality of a patient's record, the record can be filtered based upon the viewer's specialty. In other words, if the identity of a viewer reveals that they are a radiologist, the record can be filtered based upon images (e.g., x-rays, scans) and other pertinent documents included within the record. Similarly, if desired, upon viewing the virtual physical rendering of set of documents, the filter component 802 can enable a user to 'drill-down' into a particular document or set of documents so as to glean or extract inferences and conclusions regarding the particular document or group of documents.

The layout component 804 can be employed to position or otherwise organize the virtual physical rendering of the electronic documents. In other words, documents can be grouped based upon most any criteria, including but not limited to, age, condition, type, size, etc. Accordingly, these documents can be displayed upon a monitor (or display device) or virtually positioned upon a desk or table as appropriate or desired.

Figure 9:
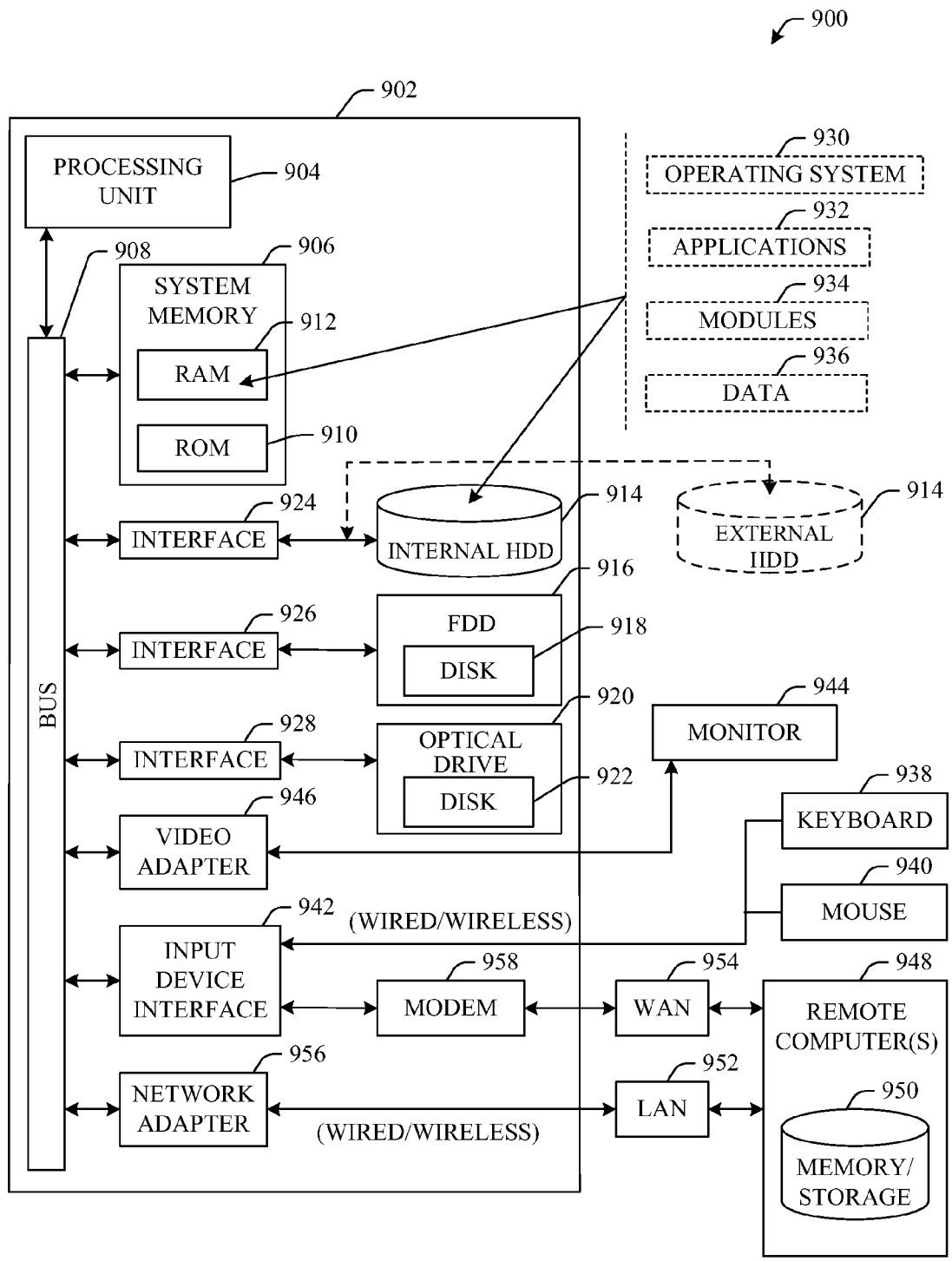
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
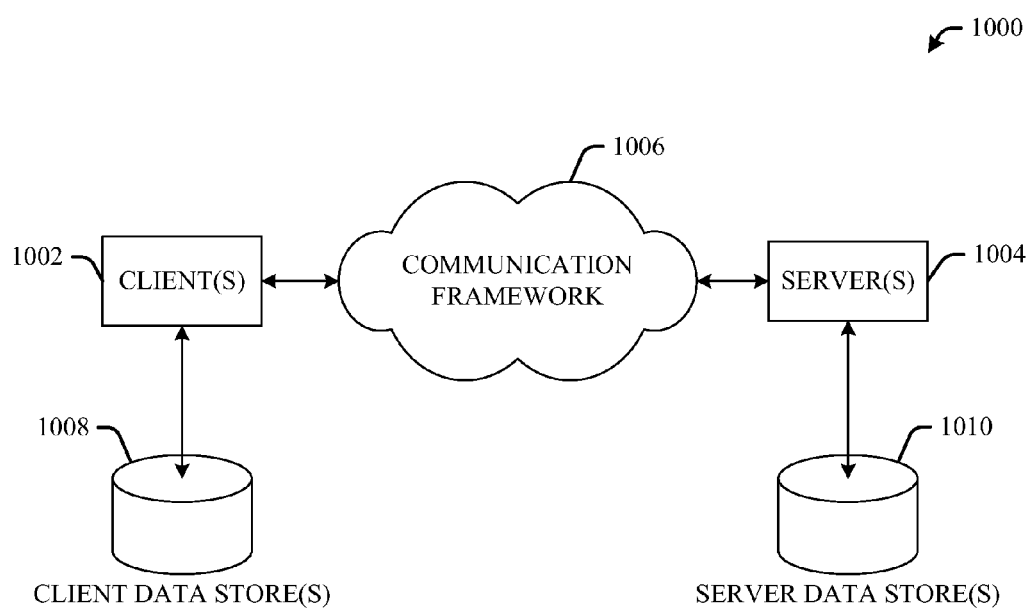
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a summarization component configured to generate an image of a document as electronic data;
   a rendering component configured to present a visual rendition of the electronic data, the visual rendition indicating a physical representation illustrating importance of content in the document;
   a context analyzer configured to recognize an identity of a viewer of the visual rendition, the identity of the viewer being a specialist; and
   an inference engine configured to provide mechanisms by which inferences and interpretations are drawn based upon the importance of the content in the visual rendition and an indication the viewer is a specialist.

2. The system of claim 1, wherein the physical representation illustrating the importance of the content in the document is by highlighting points in the document.

3. The system of claim 1, wherein the physical representation illustrating the importance of the content in the document is by turning down a corner of the document to identify important sections in the document.

4. The system of claim 1, wherein the inference engine further uses a mechanism of a support vector machine to classify the electronic data based on the importance of the content.

5. The system of claim 1, wherein the inference engine uses the mechanisms including at least one of a pattern matching, a naïve Bayes classifier, a decision tree, a neural network, a fuzzy logic model, or a probabilistic classification model.

6. The system of claim 1, further comprising a rules engine configured to define or implement a set of criteria by which the inferences or the interpretations are drawn.

7. The system of claim 1, further comprising a text analyzer component configured to parse text in the electronic data, wherein the parsed text identifies the importance of the content based on the highlighted points in the document or the corner of the document being turned down.

8. The system of claim 1, further comprising an image analyzer component configured to recognize patterns included in the electronic data, wherein the recognized patterns contribute to the importance of the content of the electronic data.

9. The system of claim 1, further comprising a format selection component configured to determine an appropriate format for the visual rendition based at least in part on an inference, a preference, a rule, a preprogrammed logic, or a policy.

10. The system of claim 1, further comprising a configuration component configured to arrange or organize the electronic data for presentation to the specialist.

11. A method implemented at least partially by a processing unit, the method comprising:
gathering electronic data of documents associated with patients, the documents aggregated from multiple sources;
providing a visual representation of the electronic data;
analyzing the electronic data based on type, origination location, or origination data;
comparing the electronic data associated with the patients of similar demographics based on the visual representation; and
drawing inferences based on the comparison of the visual representation.

12. The method of claim 11, wherein the analyzing the electronic data includes determining timelines for the electronic data.

13. The method of claim 11, wherein the analyzing the electronic data includes identifying relationships from the electronic data.

14. The method of claim 11, wherein the comparing the electronic data based on the visual representation includes an amount of data associated with a patient.

15. The method of claim 11, wherein the inferences include at least one of a healthcare state or a condition.

16. One or more computer-readable storage media encoded with instructions that, when executed by a processor, perform acts comprising:
gathering electronic data of documents associated with patients;
providing a visual representation of the electronic data to illustrate an importance of content in the documents;
identifying a viewer of the visual representation is a provider to patients; and
analyzing the electronic data between the patients from similar demographics to draw inferences or conclusions based on the content in the visual representation and an indication that the viewer is the provider.

17. The computer-readable storage media of claim 16, wherein the importance of content in the documents includes highlighting points in the documents.

18. The computer-readable storage media of claim 16, wherein the importance of the content in the documents includes turning down a corner of the documents to identify important sections in the documents.

19. The computer-readable storage media of claim 16, further comprising establishing a set of conclusions based on the visual representation of the electronic data, wherein the set of conclusions are based upon a set of pre-programmed rules.

20. The computer-readable storage media of claim 16, further comprising inferring a set of conclusions based on identifying the importance of content in the electronic data, wherein the set of conclusions are based on statistical or historical analysis.

* * * * *